Aug. 20, 1968     H. M. VAN TASSELL     3,398,063
SEPARATION OF ETHYLBENZENE AND STYRENE BY LOW
PRESSURE, HIGH TEMPERATURE DISTILLATION
Filed Nov. 22, 1966
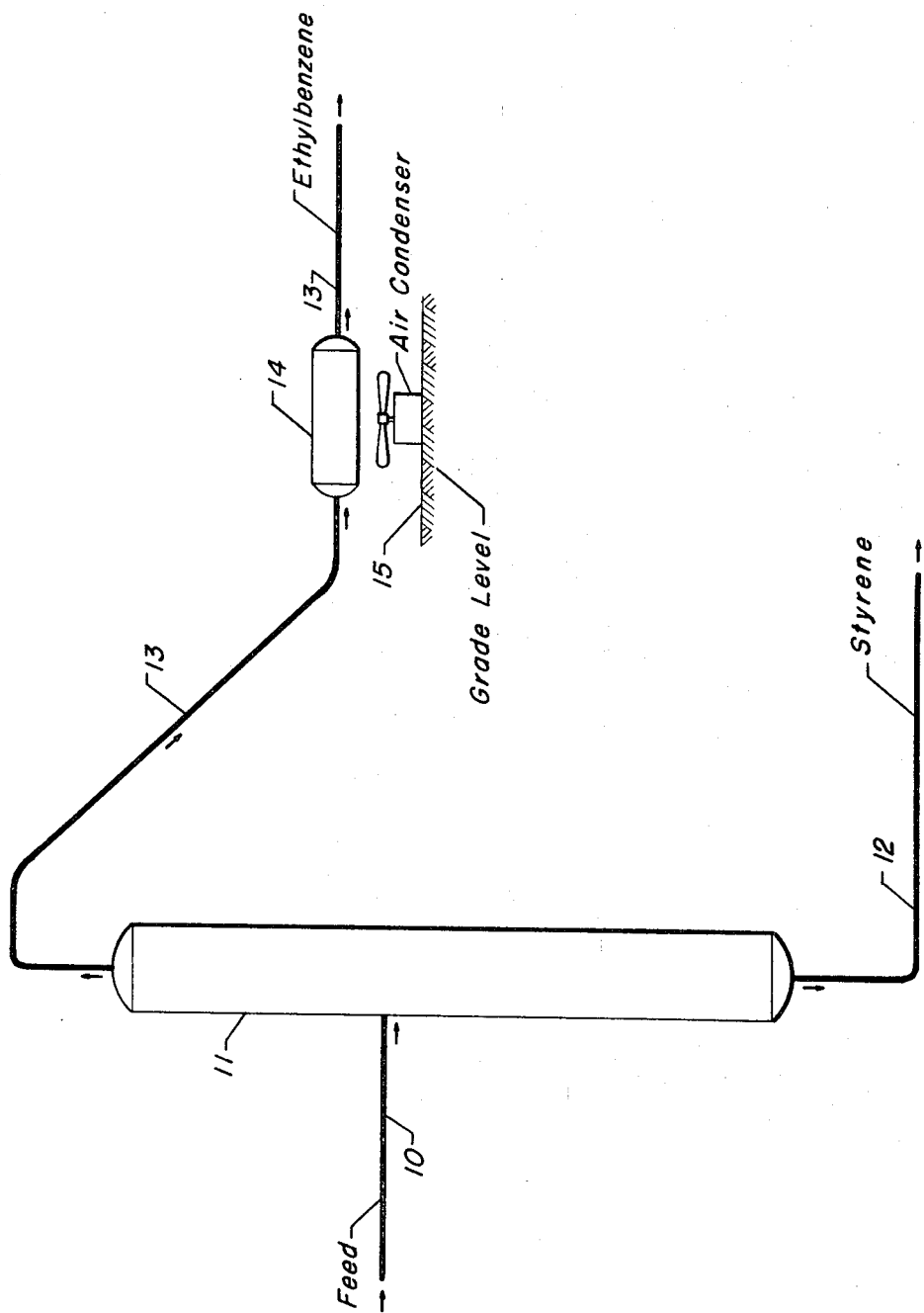
INVENTOR:
Harry M. Van Tassell
BY:
ATTORNEYS

United States Patent Office

3,398,063
Patented Aug. 20, 1968

3,398,063
SEPARATION OF ETHYLBENZENE AND STYRENE BY LOW PRESSURE, HIGH TEMPERATURE DISTILLATION
Harry M. Van Tassell, Des Plaines, Ill., assignor to Universal Oil Products Company, Des Plaines, Ill., a corporation of Delaware
Filed Nov. 22, 1966, Ser. No. 596,151
7 Claims. (Cl. 203—91)

ABSTRACT OF THE DISCLOSURE

Method for distilling a mixture of ethylbenzene and styrene in a single distillation of column having a column bottoms temperature exceeding 220° F. Styrene in a purity from 95% to 99% by weight is recovered from the bottom of the distillation column. Similarly, ethylbenzene in high purity is recovered as an overhead distillate fraction from the distillation column.

---

This invention relates to a method for fractionation. It particularly relates to a method for separating the normally liquid components contained in the effluent of an ethylbenzene dehydrogenation reaction zone. It is specifically relates to a method for separating high purity styrene from a feed mixture comprising ethylbenzene and styrene via an improved fractionation system.

It is well known in the art to subject ethylbenzene to a catalytic dehydrogenation reaction for the production of styrene therefrom. Typically, the effluent from such a reaction zone contains benzene, toluene, unreacted ethylbenzene, styrene, high boiling polymers, and some tar. This material conventionally is subjected to fractional distillation through a series of fractionation towers in order to separate the various components into relatively pure product streams. The separation, however, is extremely difficult since it has been said that styrene is easily heat polymerizable. Accordingly, the prior art processes operate the distillation system at significant sub-atmospheric pressure in order to avoid subjecting the styrene to abnormally high temperatures thereby loosing styrene through the polymerization reaction.

As an example of a prior art process, U.S. Patent No. 2,370,948, Mar. 6, 1945, to T. A. Gadwa, teaches a multiple distillation system for the purpose of producing high purity styrene from a styrene-containing mixture comprising benzene, toluene, ethylbenzene, styrene, isopropylbenzene, and other high boiling constituents. This feed mixture, according to the patentee, is subjected to an initial separation in a first fractionation zone wherein benzene and toluene are taken overhead and a relatively high boiling material, containing ethylbenzene and styrene, is removed as a bottoms product. The overhead product is passed into additional fractionation columns whereby benzene and toluene are separated in substantially pure form. The bottoms mixture of styrene and ethylbenzene is subsequently introduced into a three-tower fractionation system whereby ethylbenzene is taken as an overhead product from the first series of towers and styrene in high concentration is removed as an overhead stream from the last fractionation column in the train.

It can be seen from the teachings of this patentee, that it is, in fact, extremely difficult to separate styrene from its close boiling associaes contained in the effluent from an ethylbenzene dehydrogenation reaction zone. The patentee also teaches that the styrene is heat polymerizable.

Another more recent illustration of the prior art is contained in U.S. Patent No. 3,084,108, Apr. 2, 1963, to G. A. Randall. In this latter patent, the patentee discloses a distillation method for separating ethylbenzene and styrene in a single distillation column. However, as with the Gadwa patent, Randall discloses that benzene and toluene must be removed by a separate fractionation system and that styrene must also be separated from the tarry residue material in a final styrene recovery column. Accordingly, the most recent prior art reference discloses that a multiple train fractionation system is necessary to separate the various components from the effluent of an ethylbenzene dehydrogenation reaction zone.

It is to be noted that as recent as 1963, the prior art has associated with this process a series of fractionation towers operating at sub-atmospheric pressure and relatively reduced temperatures. One of the prime disadvantages, for example, in operating the prior art ethylbenzene columns has been the demand for extremely low pressure drop fractionation trays in order to avoid exceeding a column bottom temperature of about 215° F. It follows, therefore, that the overhead condensing systems of the prior art ethylbenzene columns must of necessity be of extremely low pressure drop. Accordingly, the prior art as a practical matter have used water condensers on the ethylbenzene overhead vapor streams and have in many instances located these water condensers high in the air in close proximity to the overhead vapor line leaving the column in order to minimize the pressure drop through the system. Even with air condensers, the prior art has mounted such condensers on the column. It must be appreciated that the operation of a distillation column at extremely low pressures is an expensive proposition. On the other hand, it is also an expensive proposition to locate condensers high in the air on supports attached to the column itself, for example.

Therefore, it is an object of this invention to provide an improved fractionation method.

It is another object of this invention to provide an improved method for the separation of styrene from ethylbenzene by distillation means.

It is a specific object of this invention to provide an improved method wherein the condensing means for the ethylbenzene overhead vapor line utilizes air and may be located at approximately grade level, thereby effecting considerable economies in the operation thereof.

The invention may be better understood by reference to the written description presented hereinbelow with specific reference to the appended drawing which is a diagrammatic representation of one embodiment for practicing this invention.

According to the present invention, a method for distilling a feed mixture containing ethylbenzene and styrene comprises introducing said mixture into a distillation column containing from 50 to 120 distillation trays, each tray having a pressure drop of no more than 4 mm. Hg absolute; withdrawing an overhead vapor stream comprising ethylbenzene at a temperature from 115° F. to 190° F. and a pressure from 40 to 245 mm. Hg absolute; withdrawing styrene as a bottoms product at a temperature exceeding 220° F.; passing said overhead stream into condensing means under conditions sufficient to produce a liquid product stream comprising ethylbenzene at a pressure at least 30 mm. Hg absolute less than said overhead pressure.

Another embodiment of this invention comprises condensing means using air as the condensing medium and wherein the pressure at the outlet of said condensing means is from 50 to 60 mm. Hg absolute less than said overhead pressure.

It must be noted from the above description that the present invention is based on the concept that styrene can be distilled in a single distillation column having a bottoms temperature exceeding 220° F. This discovery is in direct contradiction to the teachings of the prior art which limit the temperature for fractionation and ethylbenzene-styrene columns to no more than, say, about 215° F. It was surprising to find that operation of the ethylbenzene-styrene distillation column under the conditions imposed herein did not unduly cause the styrene to polymerize and did in fact permit not only the placing of the overhead condensers at grade level but permitted the utilization of air as the condensing medium and permitted the design of condensers with increased pressure drop across the condensing means thereby increasing significantly the efficiency of the condensing means.

The operating conditions imposed on the distillation column of the present invention include an overhead temperature from 115° F. to 190° F., typically 118° F.; an overhead pressure from 40 to 245 mm. Hg absolute, typically 90 mm. Hg; and a bottoms temperature exceeding 220° F., preferably within the range from 225° F. to 250° F., and typically 245° F.

As used herein, the term "exceeding 220° F." is intended to include the minimum operating conditions for the distillation tower in order to achieve the benefits recited herein, but with no maximum limit stipulated. The maximum temperature, of course, is the limit for tolerable styrene polymerization. In addition, it is usually desirable to operate the distillation column in the substantial absence of oxygen gas. On the other hand, in the event an oxygen-consuming styrene polymerization inhibitor is used in the distillation step, a small amount of oxygen gas may not only be desirable, but may be necessary in order for the styrene polymerization inhibitor to be effective. Normally, however, a relatively non-volatile styrene polymerization inhibitor, such as elemental sulfur, is used during the distillation step to further insure against the styrene polymerizing upon the application of heat.

For the description of the present invention, the terms associated with the overhead temperature and pressure and the bottoms temperature and pressure relate to conventional locations well known to those skilled in the art. For example, the overhead temperature and pressure is normally measured in the vapor space above the top tray in the distillation column. Similarly the bottoms temperature and pressure is measured at the bottoms liquid level in the column. On the other hand, other equally desirable locations may be selected by those skilled in the art. Thus, a certain amount of the styrene product may be recycled through a conventional reboiler system in order to supply heat to the column; in which case the temperature at the bottom of the column may be measured in the vapor space above the entrance to the reboiled liquid. In other words, the actual point of measurement of the operating conditions for the distillation tower of the present invention are conventional points and specifically play no part in the present invention.

The fractionation tower contemplated by this invention contains from 50 to 120 distillation trays and typically will contain approximately 70 trays. The pressure drop per tray, for practical purposes, should be no more than 4 mm. Hg absolute, preferably between 2 and 3 mm. Hg and, typically may be about 2.2 mm. Hg absolute. Additonally, the trays may be of relatively high efficiency having a significant continuous liquid film thereon. For a commercial installation therefore, the distillation column may contain about 70 trays with a 2.2 mm. Hg absolute pressure drop per tray and having a collection of liquid thereon in a known manner, e.g. use of weirs, thereby giving an overall pressure drop through the column of approximately 155 mm. Hg absolute. From the table presented hereinbelow, those skilled in the art will recognize the desirability of maintaining the distillation tower under sub-atmospheric pressure. On the other hand, from the information contained in the table, it can be seen that if the styrene distillation temperature can be significantly increased then the benefits to be derived from the practice of this invention are achieved.

TABLE I.—VAPOR PRESSURE DATA [1]

| Ethylbenzene | | Styrene | |
|---|---|---|---|
| T., °F. | P., mm. Hg | T., °F. | P., mm. Hg |
| 101 | 20 | 214 | 200 |
| 116 | 30 | 226 | 250 |
| 127 | 40 | 237 | 300 |
| 136 | 50 | 246 | 350 |
| 143 | 60 | 253 | 400 |
| 150 | 70 | | |
| 155 | 80 | | |
| 161 | 90 | | |
| 165 | 100 | | |

[1] This information is approximate only and is not to be used as accurate or absolute.

Thus, as previously mentioned, if a conventional column has a pressure drop of 155 mm. Hg and the practical limit for vacuum is 30 mm. Hg absolute, it can be seen that the pressure and temperature at the bottom of the column would be a temperature of less than 214° F. and a pressure less than 200 mm. Hg absolute. Since a pressure of 30 mm. Hg at the top of the column is equated with approximately 116° F. for the vapor pressure of ethylbenzene, it follows that the ethylbenzene must be cooled to a temperature below 116° F. before it can be condensed and recovered as a liquid product.

It was surprising to find that styrene in fact could be distilled at temperatures exceeding 220° F., e.g. 245° F., thereby permitting a pressure at the bottom of the column of about 350 mm. Hg abosolute. Accordingly, at these elevated temperatures and pressures for the bottom of the column, a considerable increase in the allowable pressure drop across the overhead condensing system can be realized, thereby giving the beneficial effect of allowing the placement of the overhead condenser at grade level for ease of installation and ease of maintenance. Further, the pressure drop achievable across the overhead condensing means is of such magnitude that the use of ambient air as the condensing medium was found satisfactory. Additionally, the imposition of a back-pressure on a vacuum column can allow for a decrease in the size of the column. Thus, considerable economy has been achieved over the prior art processes.

The invention may be more fully understood with reference to the appended drawing, wherein a feed material comprising ethylbenzene and styrene is passed into distillation column 11 via line 10. Column 11 has 70 fractionating trays therein of such design that there is approximately 2.2 mm. Hg pressure drop across each tray. Therefore, the total pressure drop across the column is approximately 155 mm. Hg absolute pressure. Styrene is removed from column 11 via line 12 at a temperature exceeding 220° F., typically at 240° F. and a pressure of about 328 mm. Hg absolute.

The ethylbenzene is removed as a vapor via line 13 and passed into air condenser 14 located at grade level 15. The conditions in column 11 include a column top temperature of from 115° F. to 190° F., and a top pressure from 40 to 245 mm. Hg absolute. Typically, these conditions include a temperature of 118° F. and a pressure of 90 mm. Hg absolute in line 13. Assuming normal pressure drop through the overhead line, and approximately 30 to 40 mm. Hg, preferably from 50 to 60 mm. Hg absolute, pressure drop across the condenser, the ethylbenzene is condensed to a liquid and is removed from the process via line 13 at a temperature of less than 116° F. and a pressure of about 30 mm. Hg absolute.

Preferably, the condensing means is an indirect heat exchange using air as the condensing medium. Thus, it can be seen that the present invention is based upon the concept that the pressure of the ethylbenzene at the outlet of the condenser is at least 30 mm. Hg absolute less than the overhead pressure on the column. Those skilled in the art can appreciate the economic benefits of being able to operate in this manner with no significant polymerization of the styrene occurring at these elevated column bottoms temperatures.

The following examples illustrate the invention:

Example I

The distillation column referred to hereinabove, containing 70 fractionation decks and charging a feed mixture comprising ethylbenzene and styrene, was operated in accordance with the prior art methods. These prior art operating conditions include a maximum bottom temperature of 215° F. and a maximum bottom pressure of 200 mm. Hg absolute. Commensurate with this system, this results in a column top temperature of about 132° F. with a maximum column top pressure of 45 mm. Hg absolute. Assuming that the practical pressure achieveable on the outlet of the condenser to be 30 mm. Hg absolute, this results in a 15 mm. Hg absolute allowable pressure drop across the condenser system to produce a condensed ethylbenzene liquid stream at a temperature of less than 116° F.

Operation of the prior art method is extremely difficult with the use of air as the condensing medium and it is almost impossible to place such condenser at grade level since no more than a minimum pressure drop can be allowed across the overhead condensing system including the overhead vapor line and condenser. Accordingly, the prior art process resulted in the use of water as the overhead condensing medium and resulted in the overhead condenser being located in close proximity to the column itself such as being hung on the column at the top thereof.

Example II

Example I conditions were repeated with the exception that the temperature in the bottom of the column was raised to 225° F. and with a resulting pressure of 250 mm. Hg absolute. The comparable column top conditions include a temperature of about 162° F. and a pressure of about 95 mm. Hg absolute. For the same condenser outlet conditions of 30 mm. Hg absolute and a temperature of less than 116° F., it can be seen that the inventive process has a total pressure drop through the condensing system of 65 mm. Hg. In addition, it is noted that the temperature difference ($\Delta T$) is at least 46° F. as compared to the 16° F. associated with the prior art processes. This, of course, results in considerably greater driving force for the transfer of heat and commensurate ease of condensing. Therefore, the process of the present invention operates with air on a fin-tubed condenser located at grade level. It is also noted in this example that there was no significant polymerization of styrene associated with the elevated temperatures and pressures of the inventive process. It is preferred, however, in these examples, and in actual operation, for a styrene polymerization inhibitor, such as elemental sulfur, be used. The elemental sulfur, tars, polymers, etc., can be, of course, separated from the styrene product by a relatively easy styrene recovery column wherein the styrene is taken as an overhead vapor product of extremely high purity.

Clearly, additional benefits may be achieved from the practice of this invention by increasing the operating temperature at the bottom of the column to as much as 245° F., and a pressure of 350 mm. Hg absolute, thereby giving under the same conditions imposed hereinabove a pressure drop through the condensing system of 165 mm. Hg absolute.

It is not known at present why polymerization of styrene does not occur at these elevated temperatures and pressures as so clearly taught by the prior art. Thus, in order to assure successful commercial operation it is suggested that the column be operated in the substantial absence of oxygen and for a minimum residence time for the styrene in the column. A residence time for styrene in the column of from 2 minutes to 50 minutes would be adequate to effect the separation. On the other hand, the presence of oxygen may, in fact, be desirable with certain types of styrene polymerization inhibitors as is well known to those skilled in the art.

When operating this invention in accordance with the teachings of Example II, above, styrene having a purity in excess of 95% by weight, typically 99+% by weight may be recovered. Similarly, the recovery of styrene will exceed 95% by weight and, frequently, can be as high as 99% by weight.

The invention claimed:

1. Method for distilling a feed mixture comprising only ethylbenzene and styrene which consists essentially of introducing said mixture into a distillation column containing from 50 to 120 distillation trays, each tray having a pressure drop of no more than 4 mm. Hg absolute; withdrawing an overhead vapor stream comprising ethylbenzene at a temperature from 115° F. to 190° F. and a pressure from 40 to 245 mm. Hg absolute; withdrawing high purity styrene as a bottoms product at a temperature exceeding 220° F.; passing said overhead stream into condensing means under conditions sufficient to produce a liquid product stream comprising ethylbenzene at a pressure at least 30 mm. Hg absolute less than said overhead pressure.

2. Method according to claim 1 wherein said condensing conditions include air as the condensing medium, and wherein the pressure at the outlet of said means is from 50 to 60 mm. Hg absolute less than said overhead pressure.

3. Method according to claim 1 wherein styrene is withdrawn at a temperature from 225° F. to 250° F.

4. Method according to claim 1 wherein said overhead pressure is from 90 to 195 mm. Hg absolute.

5. Method according to claim 3 wherein said pressure drop per tray is from 2 to 3 mm. Hg absolute.

6. Method according to claim 3 wherein said styrene purity is in excess of 95% by weight.

7. Method according to claim 6 wherein said styrene purity is from 95% to 99% by weight.

References Cited

UNITED STATES PATENTS

| | | |
|---|---|---|
| 2,398,689 | 4/1946 | Bloomer. |
| 2,411,106 | 11/1946 | Petry et al. |
| 3,039,941 | 6/1962 | Sweeney et al. |
| 3,084,108 | 4/1963 | Randall _____ 203—91 |
| 3,209,044 | 9/1965 | Meek et al. |

WILBUR L. BASCOMB, Jr., *Primary Examiner.*